Figure 1:
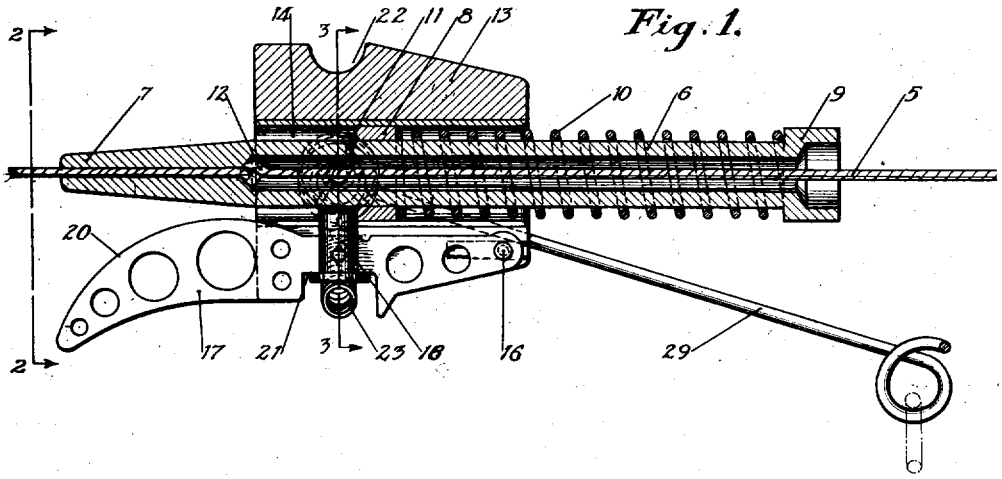

W. A. LAMKEY

March 24, 1931. TARGET TOWING AND RELEASING DEVICE Re. 18,007

Original Filed March 21, 1927 2 Sheets-Sheet 1

INVENTOR.
William A. Lamkey
BY
Robert A. Lawrence
ATTORNEYS.

W. A. LAMKEY

March 24, 1931. TARGET TOWING AND RELEASING DEVICE Re. 18,007

Original Filed March 21, 1927 2 Sheets-Sheet 2

INVENTOR.
William A. Lamkey

BY Robert A. Lavender
ATTORNEYS.

Reissued Mar. 24, 1931

Re. 18,007

UNITED STATES PATENT OFFICE

WILLIAM A. LAMKEY, OF CLEVELAND, OHIO

TARGET TOWING AND RELEASING DEVICE

Original No. 1,703,400, dated February 26, 1929, Serial No. 177,106, filed March 21, 1927, and in France January 18, 1927. Application for reissue filed December 9, 1930. Serial No. 501,154.

My invention relates broadly to a means for unfurling and releasing a target and more particularly to a target that is being towed by an aircraft.

Heretofore, when engaging in aircraft target practice with a towed target, it has been customary to let out the target so that it would open by unreeling a great many yards of cable, to which the target was attached and which was carried on a reel by the towing aircraft. When the target had reached the desired distance from the vessel or aircraft, it became unfurled and firing began. After firing had ceased, or the target had passed beyond range, it was permitted to fall to earth so that hits of any particular firing battery could be counted. To drop the target, it was necessary to cut the cable and free the target and cable from the vessel or aircraft. In permitting the equipment to fall to earth, care had to be exercised that it should fall upon water, as cable of the length necessary for protection to the aircraft could not be easily handled on land. After the equipment had fallen it was necessary for boats to put out, wind the cable on a reel, and carry it to shore to be rewound on another reel. In the meantime, the aircraft had to return to its base, make a landing, take aboard another target, and again reach the desired altitude. All this required considerable time, labor, and expense, and very often resulted in the loss of valuable equipment.

Another and more recent method of removing a target from a tow line after it had passed the range of a firing battery, has been to reel in the tow cable and manually remove the target. This very often resulted in breaking the tow cable, due to the added tension on the cable in reeling in the target.

It is an object of my invention to overcome the above inconveniences by providing a target carrying, unfurling and releasing equipment that may be automatically replaced at the end of the tow cable by another without the necessity of severing or reeling in the tow cable.

Another object of my invention is to provide a target that will be automatically unfurled upon its reaching the end of the towing cable.

A still further object of the invention consists in the use of a device towed by an aircraft for the display and the exchanging of displays of advertising matter while the aircraft is in flight.

With the above and other objects in view, the invention consists in the combination, construction, and arrangement of parts as will be hereinafter more fully described.

Figure 2:
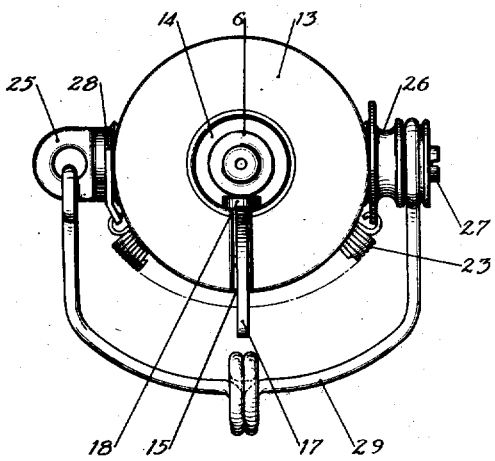
Figure 3:
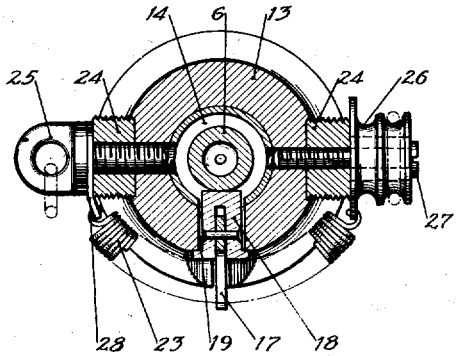
Figure 4:
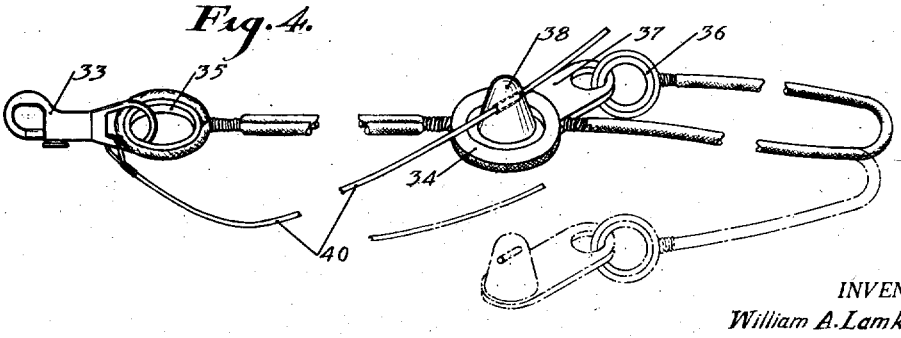
Figure 5:
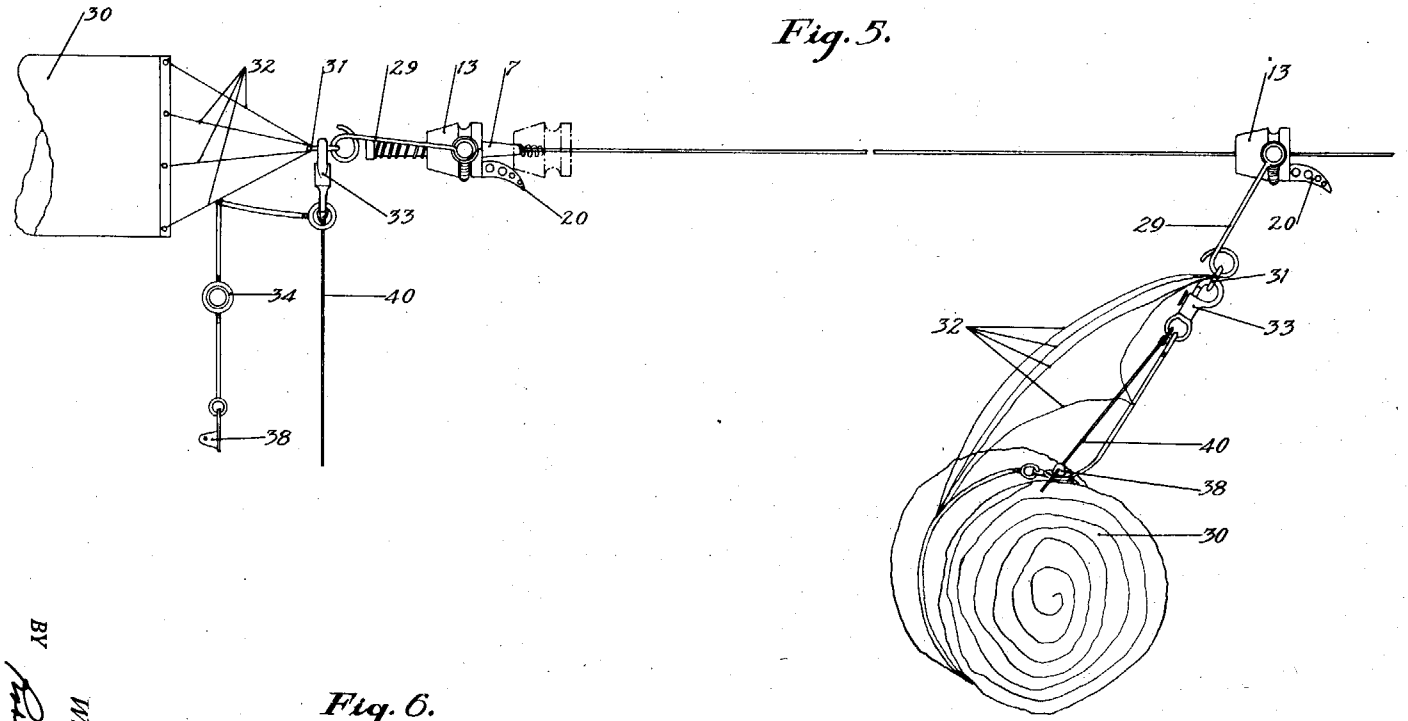
Figure 6:
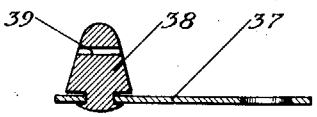

Reference is to be had to the accompanying drawings forming part of this specification, in which like reference characters indicate corresponding parts throughout the several views, and in which:

Figure 1 is a longitudinal sectional view showing my invention attached to a towing cable, Figure 2 is an end view looking in the direction of the arrows 2—2, Figure 3 is a sectional view on the line 3—3 of Figure 1, Figure 4 is a view of the target harness showing in dot and dash line how the parts become disassembled to unfurl the target, Figure 5 is a diagrammatic view of the operation of my invention, and Figure 6 is a sectional view of the cone and supporting plate attached to the harness.

In the following description of my invention I shall first describe the means for carrying the target on the tow cable, and its operation, and then explain the construction and operation of the target unfurling mechanism.

Referring more particularly to Figures 1, 2, and 3 of the drawings, 5 indicates a cable that is wound on a reel carried by an aircraft or other object that has a target in tow. A pin 6 attached to the free end of the cable is cylindrical in form with a pointed nose 7 and is provided with collars 8 and 9. The collar 9 is rigidly attached to the pin, while collar 8 is free to rotate and slide therealong, it being held removed from collar 9 by an expansion spring 10 positioned between the collars. A suitable stop 11 prevents collar 8 from falling off the pin. The cable passes through the nose of the pin into the bore of the cylindrical portion where it is securely fastened by a knot 12, or in any other desired manner. The free end of the cable extends beyond the pin a short distance to provide a means for retrieving the cable when it is desired to remove the pin. The pin serves as a weight as the cable is being unreeled to receive the target carrying device.

The target carrier, or traveler, consists of a cone-shaped body member 13 having a central bore 14 therethrough, into which the pin 6 fits when the traveler is in operative position. A slot 15 extending lengthwise of the body member communicates with the central bore permitting insertion of the cable into the bore so that the body member will ride along the cable. One end of the slot within the nose portion of the body member is broadened to receive ears 16 attached to the sides of a trigger 17 providing a sliding fulcrum for the trigger that operates in the slot to serve the two-fold service of preventing the cable from accidently coming through the slot, and of securing the body member to the pin 6. The trigger is provided with a sear or pin 18 rockingly attached thereto, and which passes through a suitable opening 19 in the body member to engage with the sliding collar 8 to prevent the traveler from riding off the pin. Spring 10 cushions the impact of the sear against the collar. The trigger is provided with an arcuate edge 20, the purpose of which will be later described, and a recess 21 that aligns with a circumferential groove 22 about the body member. A spring 23, that is seated in the recess and groove, holds the trigger so that the sear will be in engagement with the collar when in its normal position. Screw threaded studs 24 are mounted in the sides of the body member, and into one of these is screwed an eye-bolt 25, and onto the other a slip-eye 26 is secured by a fastening element 27 extending into the stud. One end of the spring 23 is attached to the slip-eye and the other to a washer 28, held in place by the eye-bolt. A bridle 29 is secured to the eye-bolt and slip-eye.

The operation of the release mechanism is as follows:

The cable 5 is unwound from the reel and allowed to hang over the side, the pin serving as a weight to prevent the flapping about of the cable end. The trigger of the traveler is removed from the slot, the cable passed therethrough, and the trigger replaced securing the cable in the central bore of the traveler. The traveler is then released and slides along the cable until the sear on the trigger engages with the loose collar on the pin. When the traveler reaches the cable end, the target is opened as will be hereinafter described. When it is desired to release the traveler held by the pin, a second traveler is attached to the cable in the same manner as the first one and released. As the conical nose of the second traveler engages between the nose of the pin and the arcuate edge of the trigger it forces the trigger outward against the tension of its retaining spring, disengaging the sear from the collar on the pin. The impact of the replacing traveler knocks the first traveler from the pin, the second one taking its place thereon by virtue of its sear engaging the collar.

The target 30 is attached to the bridle 29 by a clew ring 31 secured to the target clews 32, see Figure 5. The target harness is secured to ring 31 by a snap-hook 33. The harness consists of an elastic cable having a grommet 34 intermediate its ends. The elastic cable is connected to the snap-hook by a ring 35, and its other terminal is provided with a ring 36. A trip plate 37 having a cone member 38 swivelled thereon, see Figure 6, is connected to the ring 36. The cone is provided with an opening 39 therethrough to receive a slip wire 40 that is attached to the snap-hook.

The target is furled and secured in the bight of the elastic cable between the trip plate and grommet, the cone being placed through the grommet and held in position by the slip wire passed through the opening in the cone. The target clews are wrapped about the target and made fast to the bridle by the clew ring, and the snap-hook attached to the clew ring. The traveler carrying the target down the tow cable engages either the tow pin, or a traveler already in place, and due to the retardation of the traveler, the elastic cable stretches beyond the length of the slip wire pulling it out of the opening in the cone, freeing the grommet, and thereby releasing the target permitting it to unfurl and flow. The length of the slip wire is such that it will be easily withdrawn from the cone by the expansion of the cable.

My invention may be used not only as a target towing means for aircraft gunnery practice, but may be also used for advertising purposes. In this latter use, a sign advertising the wares of one merchant may be displayed towed in the air and without bringing the aircraft to a landing and within sight of the populace below, the sign may be dropped and another substituted, as above described, to display an advertisement of another merchant or to advertise other wares of the same merchant.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having described my invention what I claim is:

1. In combination a cable having one end attached to a moving body, a target support comprising a body portion, a fulcrumed member for securing the body portion to the cable, a bridle attached to the body portion, and a resilient means for attaching the target to the bridle.

2. In combination a cable having one end attached to a moving body, a pin attached to the free end of the cable, a target support comprising a body portion having a central bore to receive said pin, a fulcrumed member for securing the body portion to the pin, a bridle attached to the body portion, and means for attaching the target to the bridle.

3. In combination with a cable having one end attached to a moving body, a pin attached to the free end of the cable, collars carried by the pin, one of said collars being movable along the pin, resilient means separating the collars, a target support comprising a body portion, means engaging one of the collars for maintaining the body portion in position on the pin, a bridle attached to the body portion, and means for securing the target to the bridle.

4. In combination a cable having one end attached to a moving body, a pin attached to the free end of the cable, a fixed collar and a collar slidable thereon, resilient means separating the collars, a target support comprising a body portion having a central bore to receive the pin, a fulcrum member extending into the bore and engaging the slidable collar for maintaining the body portion in position on the pin, a bridle attached to the body portion, and means for securing the target to the bridle.

5. In combination a cable having one end attached to a moving body, a pin attached to the free end of the cable, a fixed and a slidable collar on the pin, means for separating the collars, a target support comprising a body portion having a central bore to receive the pin, a longitudinal slot having communication with the bore, a member slidably fulcrumed within the slot, a rocking sear attached to the fulcrumed member for engagement with the slidable collar to maintain the body portion in position on the pin, a bridle attached to the body portion, and means for attaching the target to the bridle.

6. In combination a cable having one end attached to a moving body, a pin attached to the free end of the cable, a fixed and a slidable collar on the pin, means separating the collars, a target support comprising a body portion having a central bore to receive the pin, a slot communication with the bore, a member slidably fulcrumed within the slot, a sear attached to the said member for engagement with the slidable collar to maintain the body portion in position on the pin, means for normally holding the sear in engagement with the collar, a bridle, and means for attaching the target to the bridle.

7. In combination a cable having one end attached to a moving body, a pin attached to the cable end, a fixed and a slidable collar on the pin, means for separating the collars, a target support comprising a cylindrical body portion having a central bore and conical nose, a slot communicating with the bore, a slidably fulcrumed member having an arcuate edge operable within the slot, a sear carried by the member for engagement with the slidable collar, means for normally holding the sear and collar in engagement, but expandible to permit disengagement of the said members upon a body entering between the nose and arcuate edge, a bridle attached to the body portion, and means for securing the target to the bridle.

8. In a target unfurling and releasing device, a body member attachable to a tow line and controllably detachable therefrom, a resilient target harness connected to the body member, a ring intermediate its ends, a cone attached to the harness end for engagement with the ring for forming a bight in the harness, means for securing the cone within the ring, and a target secured in the bight.

9. In a target unfurling and releasing mechanism, a body member detachably carried by a tow cable, means for disengaging the member from the cable, a target carried by the said member, and means attached to said member for unfurling the target, last said means comprising a resilient cable, a grommet, a cone member insertable through the grommet, and a member engaging the cone to secure it in the grommet, last said member being automatically disengageable upon expansion of the elastic cable.

10. In combination, an aircraft, a tow-line, an object towed by said aircraft, a second object to replace the first said object, means for slidably engaging said second object with the tow-line at said aircraft and permitting said second object to slide along the tow-line to engage the first object, and means for automatically accomplishing the replacement of the first object by the second object while both are at that end of the tow-line remote from said aircraft.

11. In combination, an aircraft, a tow-line mounted thereon, a pin at the free end of the tow-line, an object slidably along the tow-line and engageable on the pin, and a second object slidable along the tow-line, the second object freeing the first object from the pin and itself assuming the place of the first object while the aircraft is in flight.

12. In combination, an aircraft, a tow-line, an object detachably carried at the free end of the tow-line, and a second object replacing the first object while the aircraft is in flight.

WILLIAM A. LAMKEY.